United States Patent
Dreier

[11] Patent Number: 6,061,632
[45] Date of Patent: May 9, 2000

[54] RECEIVER WITH SEAMLESS CORRECTION CAPACITY

[75] Inventor: Scott David Dreier, San Francisco, Calif.

[73] Assignee: Trimble Navigation Limited, Sunnyvale, Calif.

[21] Appl. No.: 08/914,907

[22] Filed: Aug. 18, 1997

[51] Int. Cl.[7] ............................................. G01S 5/02
[52] U.S. Cl. .................. 701/215; 701/213; 342/357.03; 342/358
[58] Field of Search ..................................... 701/200, 207, 701/213, 214, 215; 342/357.01, 357.03, 357.06, 357.12, 357.13, 358, 357

[56] References Cited

U.S. PATENT DOCUMENTS

| | | | |
|---|---|---|---|
| 5,323,322 | 6/1994 | Mueller et al. | 701/215 |
| 5,365,447 | 11/1994 | Dennis | 701/215 |
| 5,523,761 | 6/1996 | Gildea | 342/357.03 |
| 5,831,576 | 11/1998 | Sheynblat | 701/215 |
| 5,884,220 | 3/1999 | Farmer et al. | 342/358 |
| 5,890,091 | 3/1999 | Talbot et al. | 701/215 |
| 5,899,957 | 5/1999 | Loomis | 701/215 |

*Primary Examiner*—Gary Chin
*Attorney, Agent, or Firm*—Wagner, Murabito & Hao LLP

[57] ABSTRACT

A system and method for determining which of a plurality of correction signals is to be used in a position determination system for determining position. An antenna receives broadcasts of correction data on designated frequencies. The received correction data is analyzed to determine the best correction data signal to use to accurately determine position. The correction data from the selected best source of correction data is coupled to a position determination system for accurate determination of position. Thus, the present invention provides a seamless correction system that determines the best source of correction data from available sources and uses the selected correction data to determine location. The seamless correction system updates the source of correction data automatically. Thus, the user does not have to take the time and effort necessary to determine the location, frequency and format of correction signals broadcast in each area and the user does not have to change frequencies or change equipment to obtain accurate position determination.

20 Claims, 9 Drawing Sheets

| VARIABLES | WEIGHT FACTOR | SITE 802 DATA | SITE 802 WEIGHTED VALUE | SITE 803 DATA | SITE 803 WEIGHTED VALUE | SITE 804 DATA | SITE 804 WEIGHTED VALUE |
|---|---|---|---|---|---|---|---|
| SEPARATION DISTANCE (Km) | 1 | 5 | 33.3 | 7 | 29.4 | 2 | 16.6 |
| NUMBER OF SATELLITES | 1 | 3 | DO NOT USE | 5 | 10 | 7 | 35 |
| AVERAGE AGE (SECONDS) | 1 | 1.5 | 22.2 | 3.4 | 4.3 | 3.4 | 4.3 |
| CYCLE SLIPS (SECONDS) | 1 | 60 | 1.5 | 5 | .44 | 120 | 2.2 |
| CONSTELLATION ERROR | 1 | .07 | 14.7 | .05 | 21.7 | .54 | 1.85 |
| SUM | | | DO NOT USE | | 115.8 | | 63.2 |
| TYPE OF CORRECTION DATA | | CMR | | RTCM 18,19 | | RTCM 1 | |

RECEIVER WITH SEAMLESS CORRECTION CAPACITY

TECHNICAL FIELD

This invention relates to vehicle location systems. Specifically, the present invention relates to an apparatus and method for vehicle location determination using multiple sources of correction data.

BACKGROUND ART

Location determination systems determine the location of receivers using data broadcast by satellites. One constellation of Satellites is the Global Positioning System (GPS) operated by the U.S. Air Force. The GPS consists of a constellation of 24 orbiting Satellites which transmit ephemerides via microwave radio.

Position determination systems determine position by receiving the ephemerides from four or more satellites. The ephemerides from each satellite are analyzed in order to determine the apparent distance from the position determination system to each satellite. The determination of apparent distance is made by measuring the time it takes for the signals to travel from each satellite to the receiver of the position determination system. These apparent distances are referred to as pseudoranges.

Pseudoranges are calculated by measuring the time it takes for the signal to travel from the satellite to the receiver. The satellites mark their transmission digitally and the receiver compares the time it receives the time mark with its own time clock. The time delay, referred to as transit time, is typically in the range of about 70–90 milliseconds. Distance is then determined by multiplying transit time by the speed of radio transmissions (approximately 300,000,000 meters/second).

Since the ephemerides data includes the location of each satellite, position may be determined by a geometric calculation that uses the known satellite positions and calculated distances (pseudoranges). GPS based positions are calculated using the World Geodetic System of 1984 (WGS84) coordinate system. These positions are expressed in Earth Centered Earth Fixed (ECEF) coordinates of X, Y, and Z axis. These positions are often transformed into Latitude, Longitude, and Height relative to the WGS84 elipsoid.

However, since the speed of radio transmissions is so fast, any errors in the measured time delay translate into significant errors in the distance calculations. For example, a one millisecond clock error in the receiver will result in a 300 kilometer error in the distance calculations. However, when four satellites are used, errors in the clock in the receiver may be compensated for by applying known calculations. Clock errors in the satellites are closely monitored by a Master Control Station which calculates clock errors in satellites and which uploads clock error data or "clock drift" to each satellite. This clock error data is included in the ephemerides broadcast by each satellite. The master control station also monitors the actual position of each satellite and uploads this information into each satellites ephemerides. Using the clock error data and the ephemerides (position parameters) from each satellite, GPS receiver can calculate an autonomous position.

Errors in location also occur due to intentional introduction of error into the broadcasted ephemerides by the U.S. Air Force and due to atmospheric conditions (referred to hereinafter as "selective availability" or "S/A"). The GPS navigation signals commonly available to civilian users are referred to as the standard positioning service (SPS). The accuracy of SPS is currently specified by the Department of Defense (DOD) to be within 100 meters horizontal position accuracy 95% of the time and 300 meters 99.99% of the time. Though the specified horizontal accuracy may be adequate for some navigational applications such as navigation of a vessel in the open ocean, maritime in coastal waterways often requires an increased level of accuracy as often does the guidance or control of land based machinery in mining, agriculture and/or construction operations.

Errors also result from atmospheric conditions. One method for obtaining accurate position that compensates for intentionally induced error and error due to atmospheric conditions is Differential GPS (DGPS). DGPS systems receive correction data broadcast from a DGPS reference station. A DGPS reference station is located at a fixed and known location. By using this information combined with the satellites' broadcast ephemerides, an actual range to each satellite is able to be determined. By differencing the received range measurement (pseudorange) with this calculated range, a correction to the satellite signal can be broadcast to other receivers that are attempting to solve for their own local location. This correction includes all induced satellite clock errors and atmospheric (ionosphere, troposphere) errors.

Differential GPS systems typically determine position in one of two ways. Traditionally, positions have been calculated using code phase differential techniques. These are normally referred to as DGPS. More recently, carrier phase techniques have been used to determine position. These systems are referred to as Real Time Kinematic (RTK) systems. Both of these techniques use differencing to solve for position, thus being "differential" in nature. The actual techniques and data used is different for each method. Systems that employ RTK techniques and data provide for a more accurate position determination, provided that the differential separation distance is short. For greater distances, a system employing DGPS techniques and data may provide for a more accurate position determination. Therefore, for a GPS system determining position using RTK techniques with data (carrier phase measurements or corrections) from a GPS reference station that is far away, a more accurate position may be determined using DGPS techniques and data (code phase data and corrections) from a closer GPS reference station, provided that such capabilities and data exist.

Differential GPS reference stations may be dedicated facilities with permanent and/or extensive broadcast capabilities or may be simply a transient Differential GPS receiver with data transmitter located at a known location.

Differential GPS reference stations then transmit either their calculated corrections to the GPS signals or their actual observations of the GPS signals (raw data), or both. When transmitting calculated corrections, errors due to atmospheric (troposphere, ionosphere, etc.) and errors due to satellite timing/clock (both intentional and process noise) are represented by the correction value. The application of these corrections at a Differential GPS receiver will compensate for these error sources. Only the common error components are eliminated. A significant area of localized error is GPS signal reflections or refractions, such that the direct signal is not solely identifiable. This is referred to as multi-path effects.

Differential GPS reference stations may also transmit their observations of the GPS signals for each satellite. This method of transmission is popular with RTK positioning techniques and systems due to the nature of typical RTK processing methods. When using this type of data format, errors associated with atmospherics and satellite timing/clock errors are removed at the moving/roving/differential GPS receiver. Most manufactures of RTK systems typically broadcast this data in a format unique to the particular manufacture. For example, Trimble Navigation broadcasts data for use in differential positioning in a Compact Measurement Record (CMR) format. This data contains code phase and carrier phase observable information for both L1 and L2 frequency bands for each satellite. The data is not corrected for S/A or for atmospheric conditions. The data is used primarily for use in RTK positioning.

Other sources of correction data which includes correction data for S/A and atmospheric conditions include broadcasts which conform to the Radio Technical Commission for Maritime Services (RTCM) format. The RTCM has established standards describing format standards, communication bands, and messages for a differential correction GPS service. Correction data which conforms to the RTCM format is broadcast by the U.S. Coast Guard and others to assist in maritime navigation. The U.S. Coast Guard has regional DGPS reference stations which calculate and broadcast correction data using the RTCM format. The RTCM correction data broadcast by some U.S. Coast Guard DGPS reference stations includes carrier phase observable data while data broadcast by other facilities only includes code phase correction data. However, irrespective of whether the particular U.S. Coast Guard facility broadcasts carrier phase data or code phase correction data, the broadcast is typically in a standard RTCM format. Other agencies and port authorities throughout the world broadcast differential correction signals conforming to the RTCM format for navigation in and around coastal areas. Both raw observable data and RTCM "correction data" is referred to hereinafter as "correction data" since both forms of data allow for correction to be made to position.

Prior art systems either receive and process RTCM correction data or CMR correction data or correction data which is in another format, unique to a particular manufacturer. Thus, using prior art systems, in order to determine position using different sources having different broadcast formats require a separate position determination system for each different broadcast format. The use of multiple position determination systems is expensive. Moreover, it is difficult to determine which system should be turned on at any particular time to get the best possible position information.

In many areas, multiple sources of correction signals adhering to a given format are available. Thus, the user must evaluate each channel to identify the source and type of data and then compare the position of each source to the known location of the vessel to determine the best source of data at that particular time. Since the absolute location of a moving vessel is often unknown (otherwise GPS would have limited utility), inspection of the solution noise and other statistical estimators must be employed to determine which solution/data source combination is best—or even usable. This process must be repeated using a different GPS receiver to be able to determine the utility of data in other formats. The process of identifying and connecting the differential GPS receiver, and it's associated processing techniques (RTK and/or DGPS), to the different source/data combinations must be performed perpetually. This process is time consuming, difficult, and prone to errors.

What is needed is a way to obtain differential correction data using differential correction signals from sources that broadcast using different formats which will not require the purchase and operation of separate systems for each different format. In addition, a GPS system is needed which will determine which source of differential correction data provides the best correction data for a particular use. Furthermore, a GPS system which is easy to use and operate is required.

DISCLOSURE OF THE INVENTION

The present invention provides a system which swiftly and automatically determines position and which uses correction data to accurately correct position when such data is available. In addition, when multiple sources of correction data are present, the present invention selects the source of correction data and local positioning technique (DGPS or RTK) that will give the most accurate determination of position.

In one embodiment of the present invention a seamless correction system is disclosed which includes a converter which is coupled to an antenna for receiving position determination correction data signals. The converter is capable of receiving multiple formats of correction data on multiple channels. The converter then determines the optimum source of position determination correction data signals and couples the position determination correction data from the optimum source of position determination correction data signals to a processor which then accurately determines the position of the seamless correction system using the correction data from the optimum source of position determination correction data.

In one embodiment, the seamless correction system includes a position determination system which determines position using satellites of the U.S. Global Positioning System (GPS). In this embodiment, a GPS antenna connects to a GPS receiver. The GPS antenna couples position determination signals to the GPS processor which demodulates the position determination signals and couples the signals to a processor. The processor uses the position determination data signals and the time of flight of the signals from the satellite to the receiver to determine a rough position. The rough position is then coupled to the converter for use in determination of the optimum source of position determination correction data signals.

In an alternate embodiment a retrofit receiver is disclosed which couples to an existing differential GPS position determination system. The retrofit receiver receives position determination correction signals and determines the optimum source of position determination correction signals. In one embodiment, the retrofit receiver uses the rough position calculations from the existing differential GPS position determination system to determine the optimum source of position determination correction data.

In one embodiment, the optimum source of correction data is chosen by determining the distance to received sources of correction data containing carrier phase correction data. In this embodiment, when a source of correction data containing carrier phase correction data is received from a source which is within a threshold distance, the source of correction data containing carrier phase correction data is used as the optimum source of correction data. When both a RTCM source and a CMR source of correction data containing carrier phase correction data are received, the CMR source is used as the optimum source. In one embodiment, when no sources of correction data containing carrier phase correction data are received from a source which is within the threshold distance, and when one or more sources of correction data containing code phase correction data are received, the source of correction data containing code phase correction data is used as the optimum source of correction data. When multiple sources of correction data containing code phase correction data are present, the closest source of code phase correction data is the best source of code phase correction data. Alternatively, a weighting process may be used to select from the multiple sources of code phase correction data.

In another embodiment, a weighting process is used to determine the best source of correction data. In this embodiment, weighting factors are applied to designated variables and the results are compared for all received correction data broadcasts so as to determine the best source of DGPS correction data.

In another embodiment, the seamless correction system would perform position computations using each source of data for every data format. Ideally, this would be done concurrently. Inspection of each process's solutions statistics and quality parameters would indicate which processing technique and data source and data format combination is optimal.

Thus, since the seamless correction system of the present invention monitors multiple sources of correction data and selects from the available sources of correction data the optimum source of correction data, there is no need for human intervention for monitoring different sources and different formats of position determination correction signals as is required with prior art systems. In addition, since the seamless correction system determines the optimum source of correction data, there is no need for the user to determine which of the multiple receivers or sources to use as is required with prior art systems. In addition, the seamless correction system of the present invention is easy to use since correction data from the optimum source is automatically coupled to the position determination system for accurate determination of position.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 1:
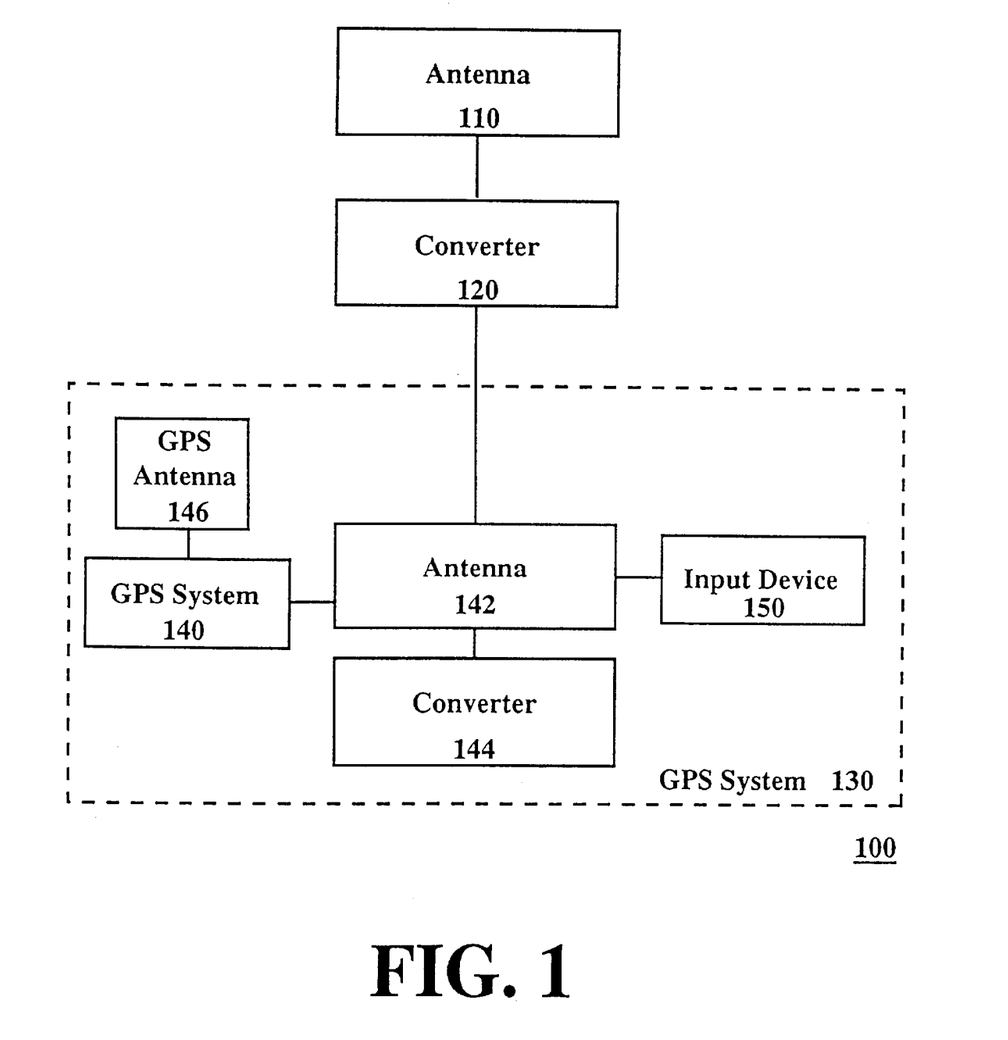
FIG. 1 is a schematic diagram of the components of a seamless correction system in accordance with the present invention.
Figure 3:
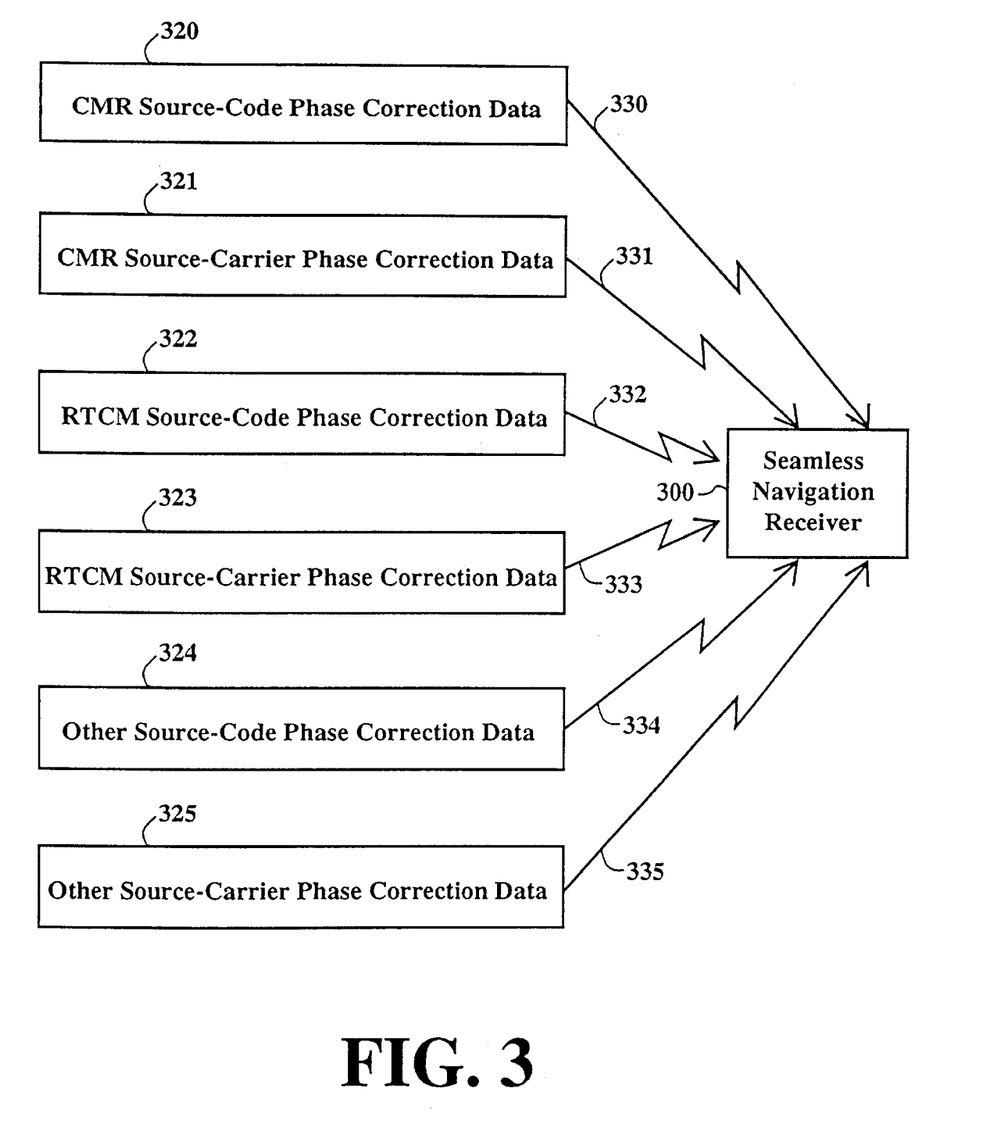
FIG. 3 is a flow chart illustrating a seamless correction receiver and alternate sources of correction data in accordance with the present claimed invention.

FIG. 1 shows seamless correction system 100 to include antenna 110 which receives differential correction signals such as differential correction signals represented by arrows 330–335 of FIG. 3. Multiple channels are monitored and multiple sources of differential signals are monitored such as, for example, differential correction signals 320–325 of FIG. 3. Seamless correction system 100 may receive differential correction signals from DGPS reference stations broadcasting in a CMR format such as, for example, CMR sources 320–321. In addition, seamless correction system 100 may receive correction signals from DGPS reference stations broadcasting in a RTCM format such as, for example, RTCM sources 322–323 of FIG. 3. Similarly, seamless correction system 100 may receive correction signals from other sources such as Other Sources 324–325 of FIG. 3.

With reference again to FIG. 1, seamless correction system 100 includes converter 120 which analyzes each source of differential correction signals so as to determine the source which provides the best source of differential correction data. The differential correction data from the best source is then transmitted to GPS system 130 of FIG. 1 for use in accurately determining position.

GPS system 130 of FIG. 1 includes GPS antenna 146 which couples signals from satellites to GPS receiver 140. GPS receiver 140 is coupled to GPS processor 142. Input device 150 and display device 144 are also coupled to GPS processor 142. GPS processor 142 is configured via a coupled user input such as input device 150 (e.g., a keyboard, a keypad, or a communications port). The use of a display device and/or input device is optional equipment specified by the requirements of a particular installation. A seamless correction receiver can operate independently of such devices.

GPS receiver 140 of FIG. 1 receives GPS satellite signals via antenna 146. The GPS signals are down converted, then de-spread and demodulated by receiver 140 and passed to processor 142. GPS processor 142 computes the correct pseudorange from the ephemeris data and the time of flight of the signal from each received satellite so as to determine a rough position which is coupled to converter 120. The differential correction data received from converter 120 (the best source of correction data) is then applied to each pseudorange in order to determines a differential GPS position, either RTK (carrier phase) or DGPS (code phase) position. The accurate position and other relevant information is communicated to the user via display device 144. Alternatively, the relevant information may be communicated to a user using an output communication port, a light bar, or another output device. The accurate position and other relevant information may also be optionally transmitted to another computer system.

Converter 120 of FIG. 1 may be physically attached to GPS system 130 or contained within a common housing such that the two form a single physical unit. Alternatively, GPS system 130 and converter 120 may be distinct units connected together via a communication port or cable. Also, the components of converter 120 of FIG. 3 may be either contained within a single physical unit or may be separate units connected via a communication port or cable. Similarly, the various components of GPS system 130 may be contained within a single physical unit (e.g., a housing) or they may be separate, connected via a communication port or cable. In an embodiment using a communication port, the communication port can be one of may well known interface standards in use in the electronics field (e.g., RS-232, RS-422, ethernet, CAN bus/ISO-11898/SAE-J1939, Mil-Std 1553, and the like).

Figure 2:
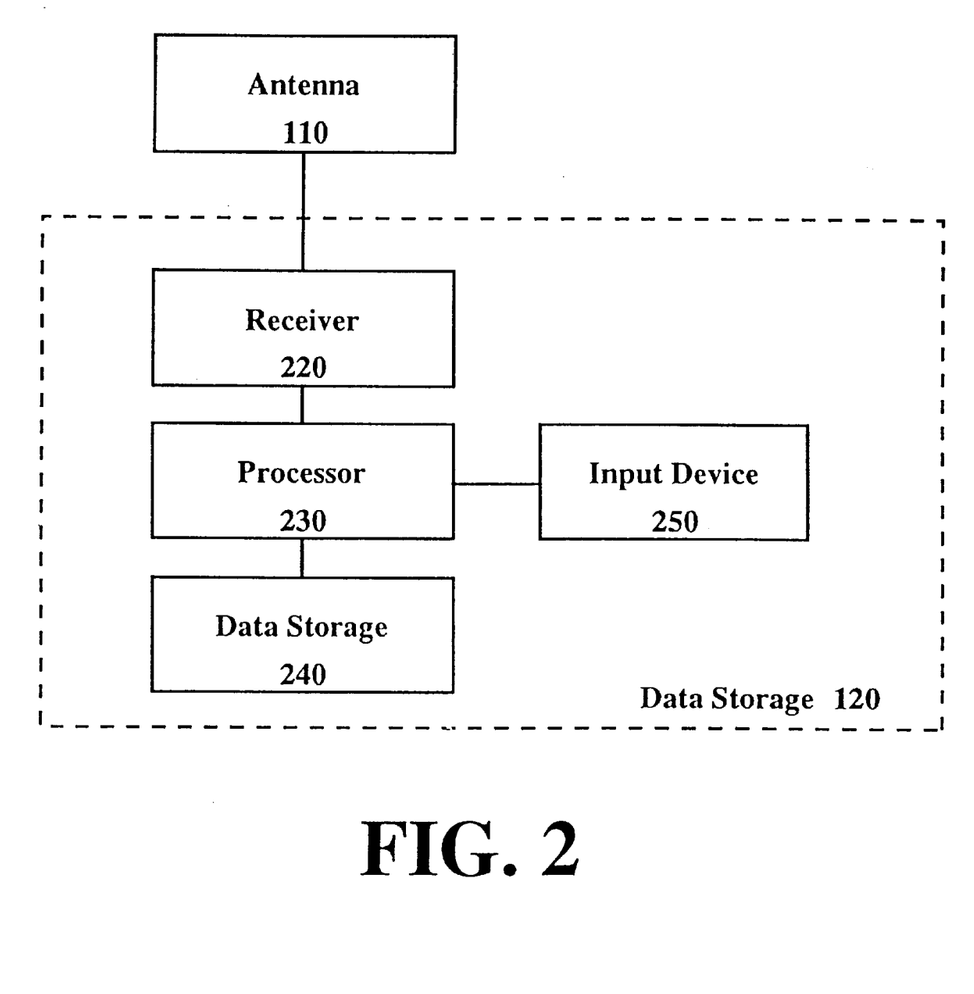
FIG. 2 is a diagram of an antenna and a converter in accordance with the present claimed invention.

In one embodiment, converter 120 includes receiver 220 of FIG. 2 which includes a radio demodulator and a digital signal processor. In one embodiment, receiver 220 is a standard RTCM compatible receiver which is adapted to receive differential correction signals broadcasts on multiple channels via antenna 110 of FIG. 1. Receiver 220 is coupled to processor 230. Differential correction signals received by receiver 220 are down converted, then de-spread and demodulated and passed to processor 230. Processor 230 determines the optimum source of differential correction signals using data stored in data storage device 240 which is coupled to processor 230. In one embodiment, data storage device 240 is a non-volatile data storage device. Once the optimum source of differential correction data is determined, the differential correction data from the optimum source of differential correction signals is transmitted to GPS system 130 of FIG. 1 where it is used to accurately determine position.

Figure 4:
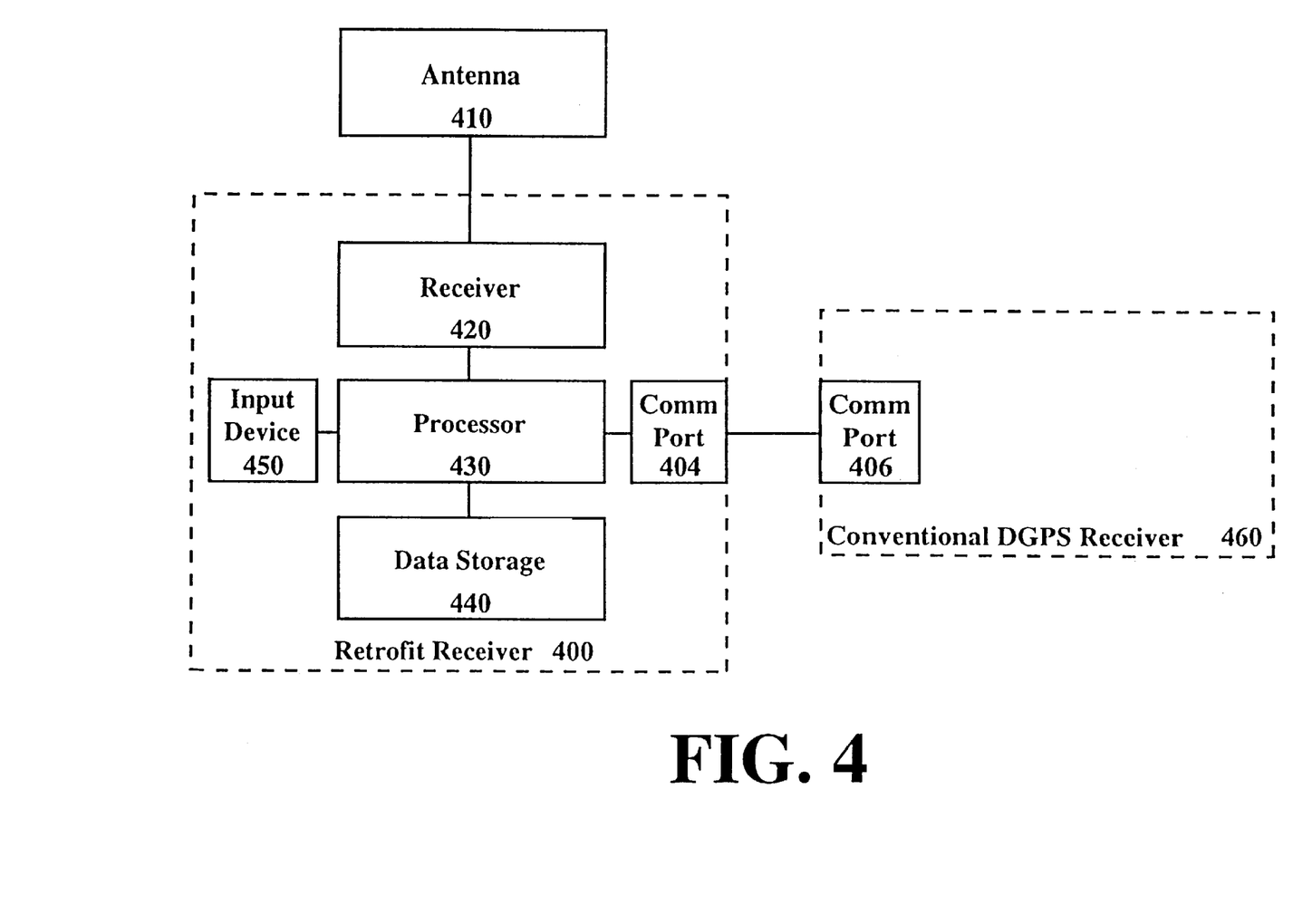
FIG. 4 is a schematic diagram illustrating a seamless correction system including a retrofit receiver in accordance with the present claimed invention.

In the embodiment of the present invention shown in FIG. 4, a seamless correction system may be formed using an existing conventional DGPS receiver by coupling a retrofit receiver such as retrofit receiver 400 thereto. Retrofit receiver 400 is equipped with communications port 604 which is an industry standard communications port. Retrofit receiver 400 is coupled to a second similar communications port 406 built into conventional DGPS receiver 460. Antenna 410 receives DGPS correction signals and couples them to retrofit receiver 400.

In the embodiment shown in FIG. 4, retrofit receiver 400 receives a rough position fix from the conventional DGPS receiver 460 via communications port 404. Using the rough position fix, retrofit receiver 400 determines the optimum source of correction signals and couples the correction signals to conventional DGPS receiver 460. The format in which the correction signals are coupled to conventional DGPS receiver are determined by the requirements of the particular conventional DGPS receiver used. For example, conventional DGPS receivers which are adapted to receive digital correction data in a standard format will receive the data in the standard format and conventional DGPS receivers which only process correction data in a specific manufacturer-defined format will receive the data in the required specific manufacturer-defined format. For example, when conventional DGPS receiver is designed to receive correction data in a CMR format, such data will be coupled to it in a CMR format, Similarly, when the particular DGPS receiver used is designed to receive correction data in a RTCM format, the correction data is translated into the RTCM format and coupled to conventional DGPS processor 400 in the RTCM format. Alternatively, output could be in a standard form such as in a NMEA QA/QC format data stream.

However, many manufacturers have different protocols and message definitions for providing position and ephemerides. Receivers from some manufacturers do not provide position or ephemeris at all. For these receivers, and the receivers which retrofit receiver cannot successfully interface, a separate source of rough position is required in order to determine the optimum source of correction data.

Figure 5:
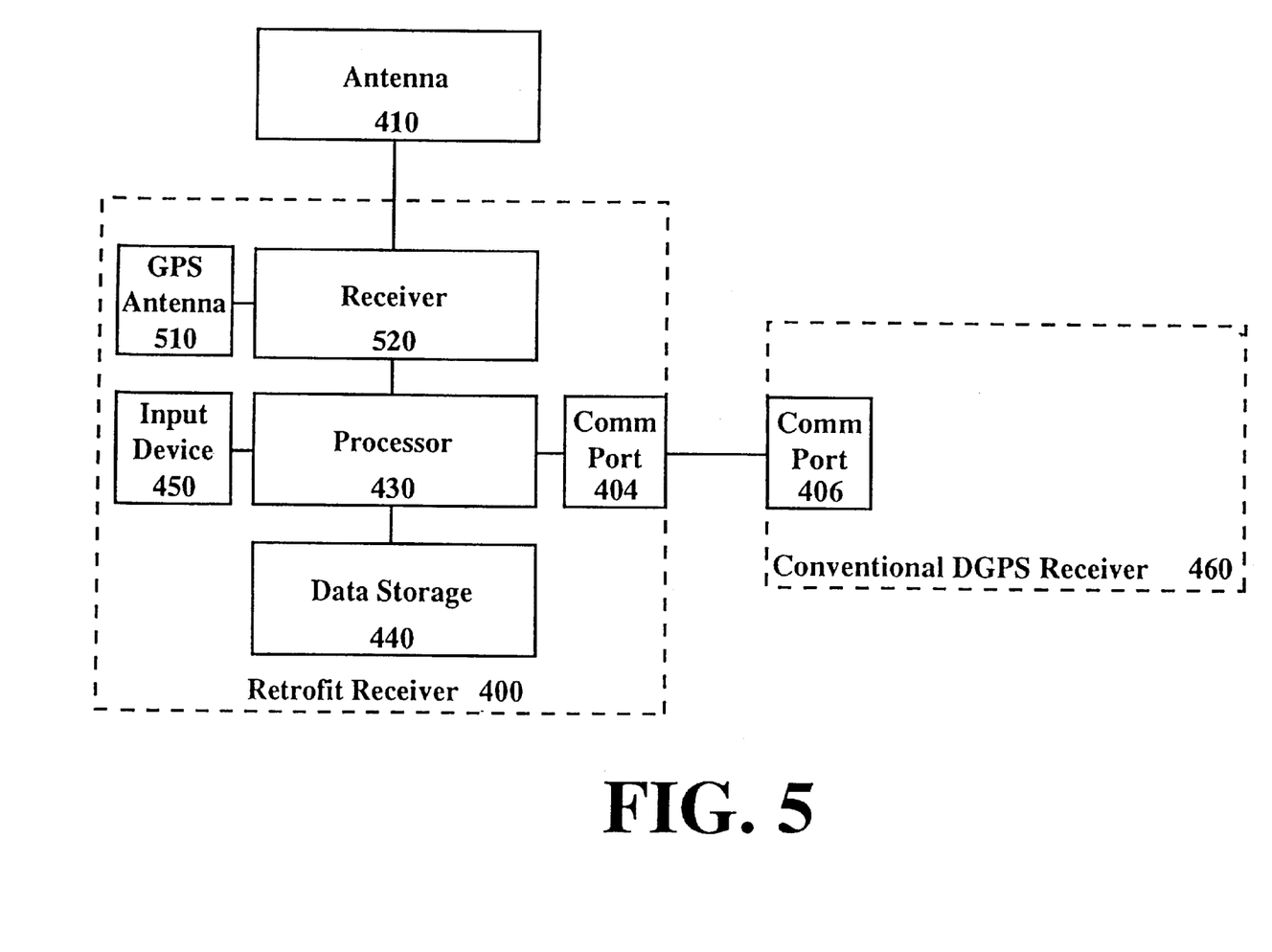
FIG. 5 is a schematic diagram illustrating a seamless correction system including a retrofit receiver in accordance with the present claimed invention.

In one embodiment of the present invention which is shown in FIG. 5, the retrofit receiver includes position determination capabilities for determining rough position. This embodiment includes GPS antenna 510 and receiver 520 for coupling satellite signals and ephemeris to processor 430. Receiver 520 receives and demodulates signals from GPS satellites and receives and demodulates broadcasted DGPS correction data. Though a single receiver is shown for processing both satellite signals and DGPS correction data signals, multiple receivers could also be used. Processor 430 determines elapsed time of flight for each satellite's signals to reach GPS antenna 510, and, using the ephemerides from each satellite calculates the rough location. This rough location is then used for determining the optimum source of correction data.

Figure 6:
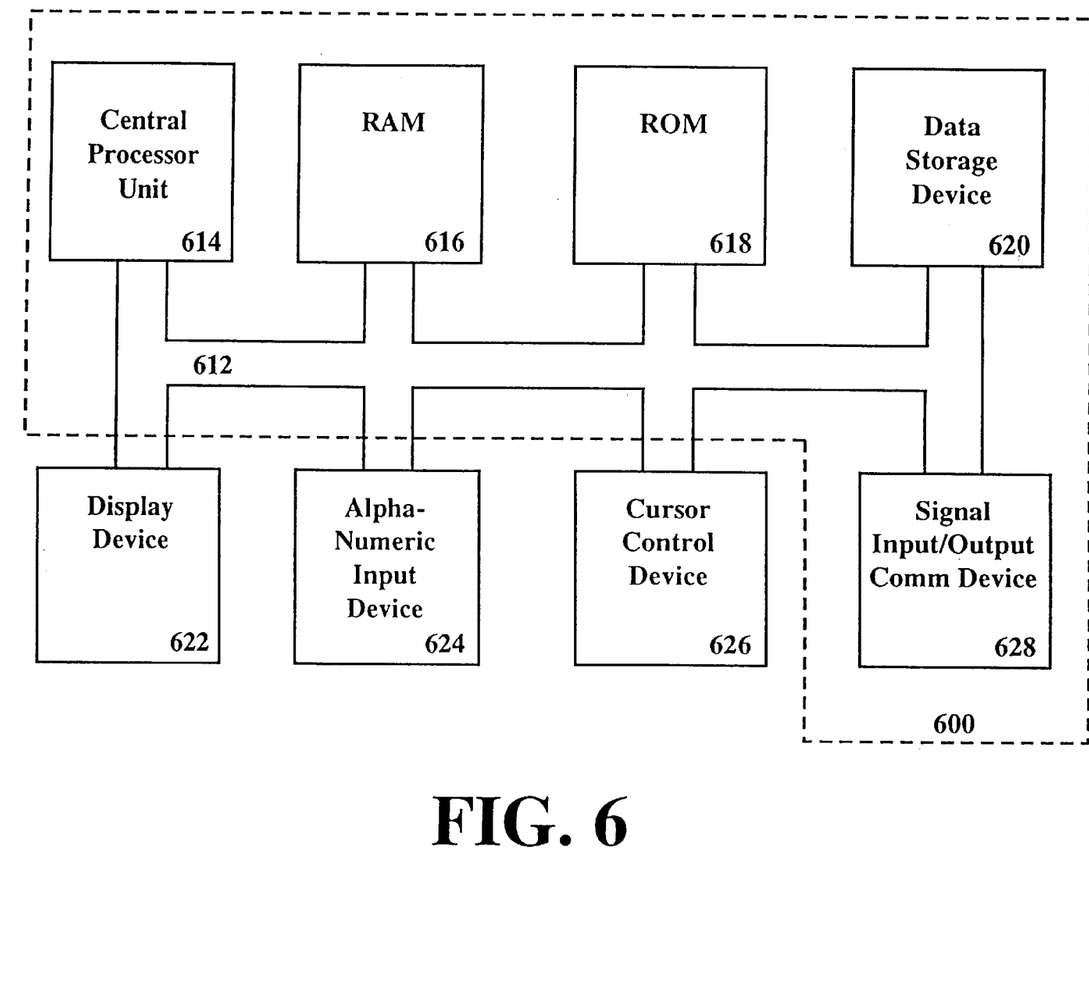
FIG. 6 is a schematic diagram of an exemplary computer system used as part of a seamless correction system in accordance with the present claimed invention.

In one embodiment of the present invention, the seamless correction system of the present invention is implemented in a computer such as computer 600 shown in FIG. 6. Portions of the present seamless correction system are comprised of computer executable instructions which reside in a computer system 600. The seamless correction system implemented into computer system 600 has radio signal processing capabilities. In one embodiment, the radio signal processing capabilities are implemented by one or more antennas (not shown) and demodulators (not shown) for coupling GPS signal from satellites and DGPS correction data to computer 600. It is appreciated that seamless correction system of FIG. 6 is exemplary only and that the present invention can operate within a number of different computer systems other than the computer system illustrated in FIG. 6. Other computing systems include general purpose computers systems, embedded computer systems, and stand alone computer systems specially adapted for seamless correction.

Computer 600 of FIG. 6 includes an address/data bus 612 for communicating information, a central processor unit 614 coupled to bus 612 for processing information and instructions. Signal input and output comm device 628 of computer 600 is coupled to bus 612. In one embodiment, signal input and output comm device 628 includes a radio demodulator for demodulating radio signals which may be directly coupled from one or more antennas to input output comm device 628. Alternatively, radio signals may be received, demodulated and transmitted in digital form to input and output comm device 628. Computer 600 also includes data storage features such as a random access memory 616 coupled to bus 612 for storing information and instructions for central processor unit 614, a read only memory 618 coupled to bus 612 for storing static information and instructions for the central processor unit 614, and a data storage device 620 (e.g., a magnetic or optical disk and disk drive) coupled to bus 612 for storing information and instructions. Computer 600 also includes display device 622 which is coupled to bus 612 for displaying information (e.g., a map showing the position of the vessel and latitude, longitude, elevation, time, speed, heading information, etc.) to an operator. Computer 600 may also include a output communications port for transmitting the position to external devices—either other computers or other user interfaces (i.e., Light bars). An alphanumeric input device 624 including alphanumeric and function keys is coupled to bus 612 for communicating information and command selections to central processor unit 614. Computer 600 also includes cursor control device 626 which is coupled to bus 612 for communicating user input information and command selections to central processor unit 614.

Display device 622 of FIG. 6, utilized with computer 600 of the present invention, may be a liquid crystal device, cathode ray tube, or other display device suitable for creating graphic images and alphanumeric characters recognizable to the user. Cursor control device 626 allows the computer user to dynamically signal the two dimensional movement of a visible symbol (cursor) on a display screen of display device 622. Many implementations of cursor control device 626 are known in the art including a trackball, mouse, touch pad, joystick or special keys on alphanumeric input device 624 capable of signaling movement of a given direction or manner of displacement.

Alternatively, it will be appreciated that a cursor can be directed and/or activated via input from alphanumeric input device 624 using special keys and key sequence commands. The present invention is also well suited to directing a cursor by other means such as, for example, voice commands.

Figure 7:
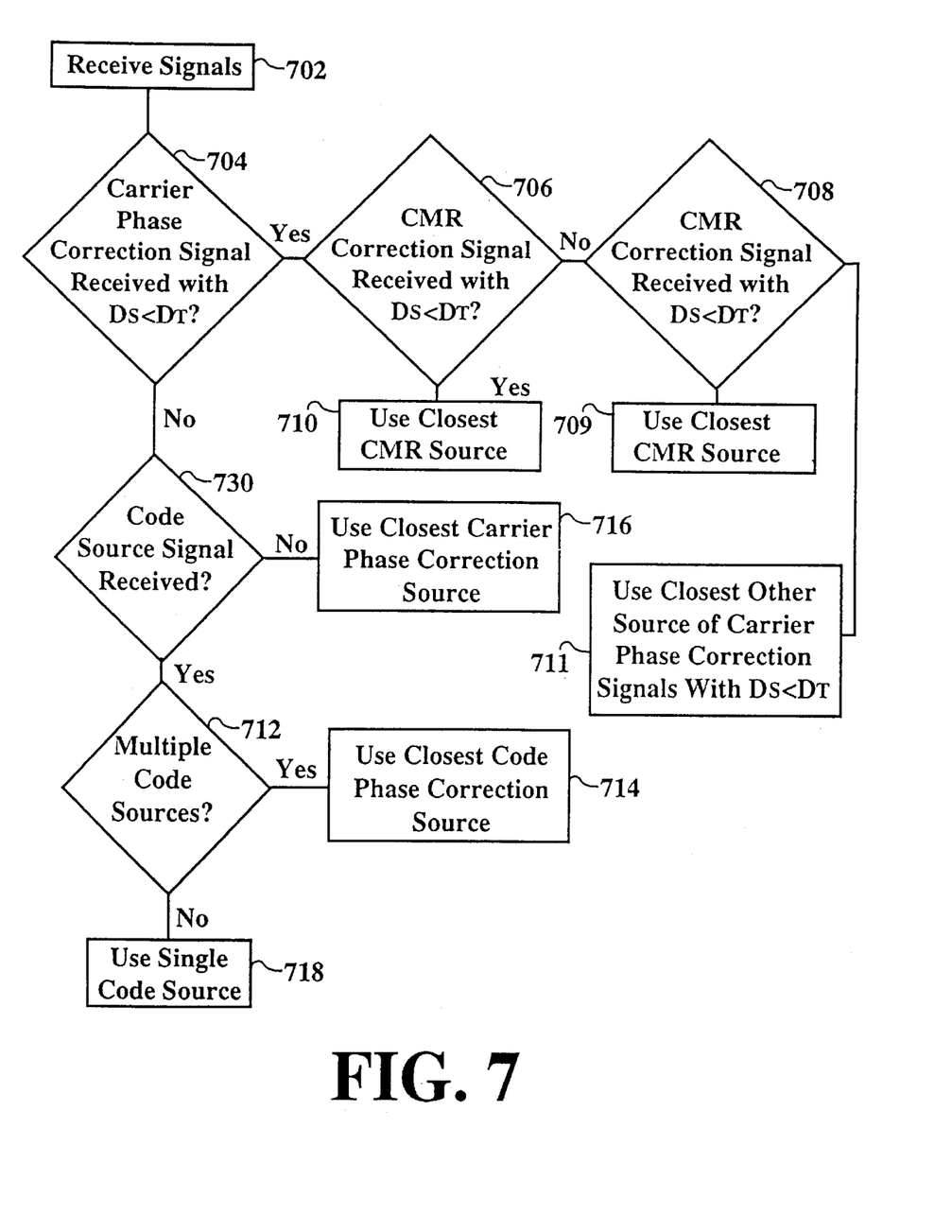
FIG. 7 is a schematic diagram showing a selection process for determining the best source of correction data in accordance with the present claimed invention.

With reference next to FIG. 7, a flow chart illustrating steps employed by the seamless correction process of the present invention is shown. During use of the present invention, as a boat or other vehicle is operated in an area where correction data is available via radio, signals from one or more broadcasters of DGPS correction data are received as shown by block 702. These signals may be received from any of a number of known sources and may be received on various frequencies and formats. In one embodiment of the present invention, signals are received over nine channels via dual frequency units. These formats include RTCM SC 104 L1 C/A code, RTCM SC-104 RTK/OTF (types 18, 19, 20, and 21) and Trimble CMR RTK/OTF.

The seamless correction system of the present invention includes a switch over threshold (hereinafter "threshold") that determines the range within carrier phase correction signals are to be used. The threshold may be user-defined so as to allow for the user to select a threshold to meet his specific needs.

As shown by block 704, if a signal with carrier phase correction data is received and if the separation distance between the vessel and the reference station is less than the threshold (default is 10 Km), then a carrier phase signal is selected as the optimum signal. When a signal in the CMR format is present which has a separation distance between the vessel and the reference station of is less than the programmable switch over threshold (Ds<Dr), as shown by blocks 706, 710 the signal in the CMR format is chosen as the optimum signal (when two or more CMR signals meeting the designated criteria are received, as shown by block 710, the closest signal is chosen). When the CMR signal has been chosen as optimal, carrier phase differential processing (RTK) techniques are invoked within the seamless correction receiver. If a CMR signal is not received which has a separation distance between the vessel and the reference station of less than the programmable switch over threshold, then the closest signal with carrier phase correction data in a RTCM format (RTCM type 18 or type 19) is used as the optimum signal as shown by blocks 708, 709. Alternatively, as shown by block 711 the closest source of correction data having another format and having carrier phase correction data that is broadcast from a source within the threshold distance from the seamless correction system is selected as the best source of correction data.

Continuing with FIG. 7, if a single code phase correction signal (e.g. RTCM type 1 or type 9) is received, and if the separation distance between the vessel and all reference stations broadcasting carrier phase correction signals is more than the programmable switch over threshold (default is 10 Km), as shown by blocks 730, 712, 718, the code phase correction signal is designated as the optimum source. If multiple code phase correction signals are received, and if the separation distance between the vessel and all reference stations broadcasting carrier phase correction signals is more than the programmable switch over threshold (default is 10 Km), as shown by blocks 712,714, the closest code phase source is the optimum source. If a code phase correction signal is not received, as shown by block 730, 716 the carrier phase correction signal closest to the seamless correction system is designated as the best source.

Alternatively, a weighting process may be used to select a source as opposed to using the closest source meeting the designated criteria. For example, with respect to the decisions represented by blocks 706, 709, 711, 716, 714 a selection process which applies weights to selected variables (weighting analysis) may be used. Other criteria which may be applied in the weighting analysis process include the use of a designated hysterisis and aging criteria. Ceiling values may be used for one or more variables so as to add hysterisis to the system such that values for each variable which are above the hysterisis value are changed to the ceiling value so as to produce statistically identical solution accuracy's for calculations. In one embodiment, all distance comparisons have a hysterisis of 200 meters to deep the system from oscillating between reference receivers. Selection criteria may also be applied to aging of data such that only data which fits within predetermined bounds is allowed. In one embodiment, only carrier phase data which has an age of less than 5 seconds may be used (e.g. CMR data or RTCM type 18 and 19 data) and only code phase data (e.g. RTCM type 1 or 9) which has an age of less than 20 seconds may be used.

In one embodiment, separation distance, number of satellites, average age, cycle slips, and measurement quality are used in the weighting process. Separation distance is the distance between the vessel and the DGPS reference station where the correction data is measured. In one embodiment separation distance is determined by using the rough determination of location provided by the pseudoranges calculated by the GPS processor, before any DGPS correction is applied. In a typical DGPS correction data broadcast, number of satellites, average age, cycle slips, and measurement quality data is included and such data is required in RTCM broadcasts. Number of satellites is the number of satellites received used by the DGPS reference station to determine the broadcasted correction data. Average age is the measurement of the frequency of updates and transmission delays correction data broadcast by the DGPS reference station. Cycle slips are a function of the number of continuously locked measurements of correction data broadcast by the DGPS reference station. Measurement quality is a statistical estimator of the inherent uncertainty of the measurement process. It can take many forms, including standard deviation of the actual measurements, Root Mean Squared (RMS), Circular Error Probability (CEP), Carrier/Noise Ratio (C/No), or some other Figure of Merit for relative comparison of different measurement sources.

In one embodiment, the separation distance is given a relative weight of 80% and the number of satellites is given a relative weight of 10%. Average age is given a relative weight of 0.8% and cycle slips is given a relative weight of 0.3% while measurement quality is given a relative weight of 0.3%. Any of a number of methods may be used to apply the weighting factors to each of the variables. In one embodiment, each variable is scaled to a predetermined range. Then each scaled variable is multiplied by it's designated weighting factor and the results are totaled. The totals for each DGPS reference station are compared and the DGPS reference station with the highest total is the optimum DGPS correction data source.

Figure 8:
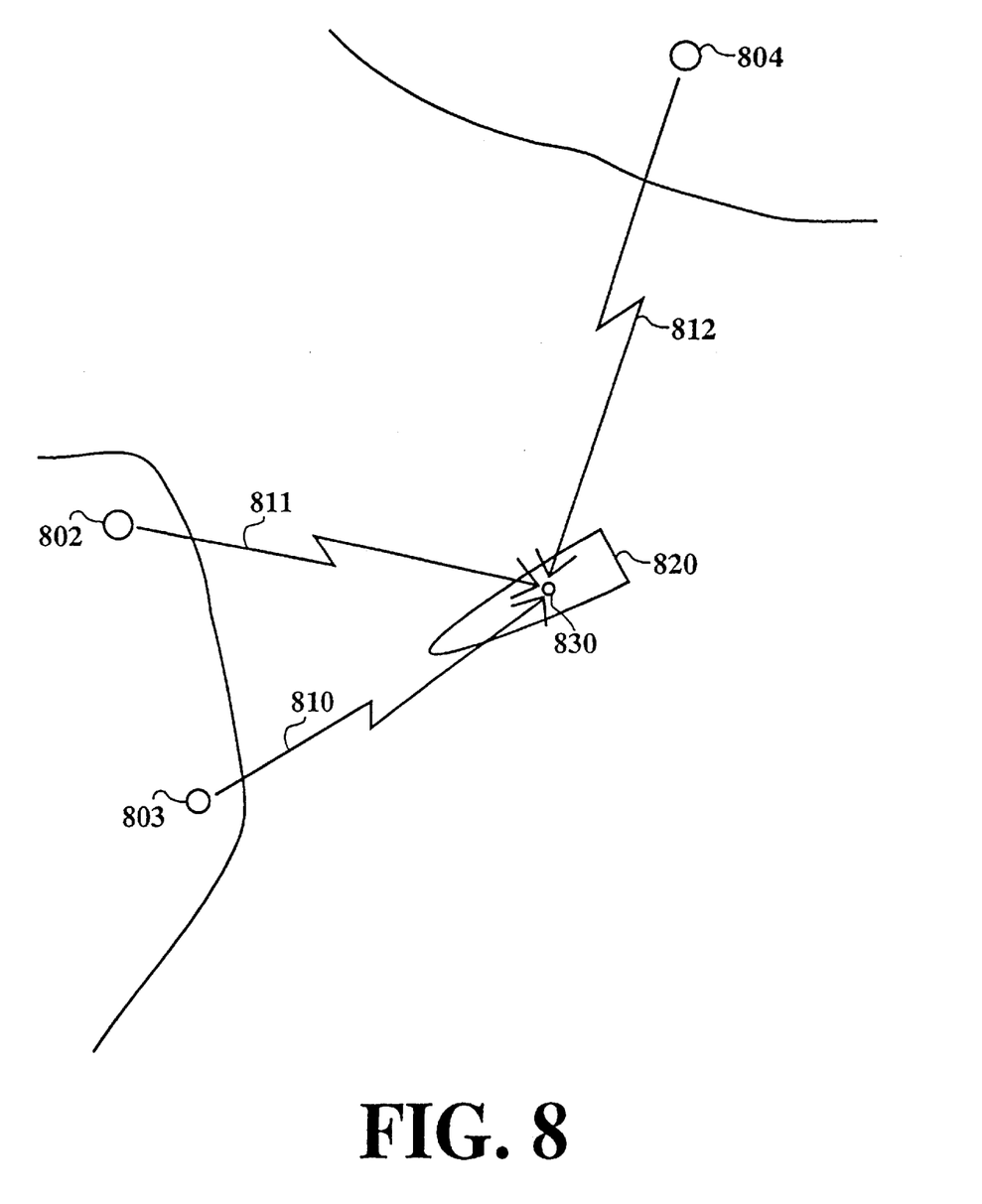
FIG. 8 is a diagram of a vessel including a seamless correction system which is receiving correction data from multiple sources of correction data in accordance with the present claimed invention.

With reference to FIG. 8, vessel 820 is in a location in which receives DGPS correction signals broadcast by DGPS reference stations 802–804. Seamless correction system 830 is located on vessel 820 such that it receives DGPS correction signals broadcast by DGPS reference stations 802–804 as shown by arrows 810–812.

An example of the calculation of the optimum DGPS correction data source for vessel 820 of FIG. 8 follows. In this example, a threshold of 10 kilometers is used. In this example, DGPS reference station 802 is broadcasting carrier phase correction data in a CMR format and when DGPS reference station 803 is broadcasting carrier phase correction data in a RTCM format and when DGPS reference station 804 is broadcasting code phase correction data in a RTCM format follows. In this example, separation distance between vessel 820 and DGPS reference station 802 is 5 kilometers and DGPS reference station 802 is 7 kilometers and separation distance between vessel 820 and DGPS reference station 804 is 2 kilometers. With reference back to FIG. 7, since a correction signal is received which is at a distance less than the threshold distance, as shown by block 704, and since there is a CMR correction signal received with a distance less than the threshold distance, the source broadcast using the CMR format is used as shown by block 710. Thus, in this example, DGPS reference station 802 is the optimum source of correction data.

In an alternate embodiment, the decision process shown in FIG. 7 is not used to determine the optimum source of correction data. Instead, the source is selected using a weighting analysis. In this embodiment weighting factors are applied so as to weight DGPS correction signals containing carrier phase correction data and DGPS correction signals containing code phase correction signals separately. DGPS correction signals including carrier phase correction are highly favored since they produce a more accurate determination of position. However, depending on the characteristics of the sources, when one or more DGPS correction signal which includes code phase correction data is received, it's characteristics are weighted along with code phase sources to determine the optimum source of correction data. Thus, depending on the results of the weighting analysis, either code phase or carrier phase correction data sources could be designated as the optimum data source.

With reference again to FIG. 8, vessel 820 is in a location in which receives DGPS correction signals broadcast by DGPS reference stations 802–804. Seamless correction system 830 is located on vessel 820 such that it receives DGPS correction signals broadcast by DGPS reference stations 802–804 as shown by arrows 810–812.

To implement the Seamless navigation feature within a GPS receiver, first, a set of measurement data is determined that will be used for input to the seamless navigation selector (e.g., Separation distance, Number of common satellite vehicles ("SVs"), Average age of correction data, Continuous data, SV constellation error, and/or PDOP). Next, the data is normalized so that each data type can be compared to others. In one embodiment, functions that generate an inverse of the expected or measured noise contribution from the various input data types are created (In mathematical terms, the noise referred to herein is often referred to as uncertainty). Each function has a floor value, under which the noise can not be improved upon. When forming the inverse of the noise, this floor value keeps the inverse from unnaturally influencing the result. Otherwise, as the noise approaches zero, the inverse would asymtotically approach infinity.

In some cases, the function would have to generate a Do Not Use for the particular reference station being evaluated. In the case of CMR or RTCM/RTK (types 18,19 and types 20,21), having less than 5 satellites there is not enough information to resolve the carrier phase integer ambiguity. Therefore, it's associated function should unilaterally delete the particular reference station from consideration. No where is the function assumed to generate solely a linear relationship between its input value and its output. For instance, consider the Number of Common Satellite vehicles. In general, more satellite vehicles will generate a more accurate position through the redundancy of measurements and the inherently better geometry (PDOP). However, once above 8 satellite vehicles, this relationship does not provide significant improvement for additional satellites. Therefore, in one embodiment, this function yields the same noise (or inverse noise) value for all constellations consisting of 8 or more satellites.

In some implementations, it may not be necessary to try and correlate the decision criteria to a physical noise value. For instance, in one embodiment, only separation distance and data content (Carrier phase correction data vs. Code phase correction data) is used for decision making. In this case, carrier phase correction data and processing techniques always get priority provided that the reference station is within a threshold distance under which the process will be expected to yield accurate results. This decision is based upon the fact that RTK processing techniques usually yield more accurate results that Code phase DGPS techniques when the separation distance is short (e.g., <10 Km). In the presence of both CMR carrier phase correction data and RTCM carrier phase correction data (RTCM types 18, 19 or 20, 21), the CMR broadcast is used due to it's better processing characteristics (lower byte count, easier to process).

Once the input data has been normalized through their respective normalizing functions, comparison of different reference station correction data is possible. In one embodiment, each value is given uniform weight. That is, each has equal weight. In another embodiment, different weights (multipliers between 0 and 1) that express the relative importance of one input data type over other types. These weights may be different for different end use applications. For instance, when using a RTK system capable of quick carrier phase integer ambiguity initialization, the importance of continuous data (lack of cycle slips) will have less importance. To illustrate, consider the RTK system that can perform ambiguity resolution within 3 seconds. If cycle slips are occurring every minute, then this reference station is still usable. In this case, the weighting for this data type would be low relative to others. Now consider the case of an RTK system requiring 1 minute to initialize with cycle slips occurring every 30 seconds. This system would never initialize, therefor, the relative weight of this data type would have to be high for this case.

Once weighting and functions have been developed for the particular application or application type, the function outputs are multiplied by the respective weighting value. The result of all data types is summed. The resulting reference station with the highest summation, or score, is selected for use.

Figure 9:
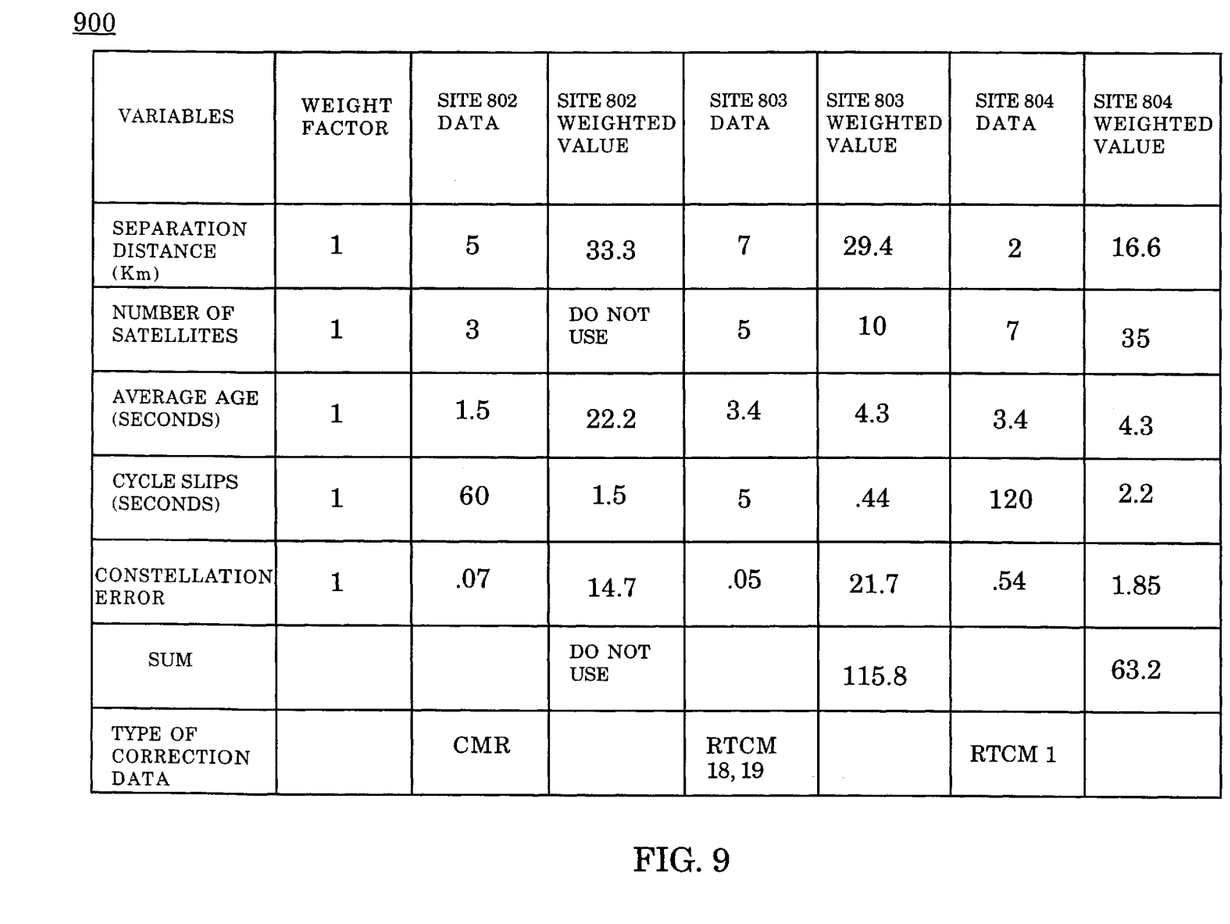
FIG. 9 is a chart showing an example calculation using weighting values to determine the optimum source of correction data in accordance with the present claimed invention.

An example of the calculation of the optimum DGPS correction data source for vessel 820 of FIG. 8 when reference station 802 is broadcasting carrier phase correction data in a CMR format, and when reference station 803 is broadcasting carrier phase correction data in a RTCM format, and when DGPS reference station 803 is broadcasting code phase correction data in a RTCM format, is shown in FIG. 9. In this example, separation distance between vessel 820 and DGPS reference station 802 is 5 kilometers and DGPS reference station 802 is receiving signals from 3 satellites with the last cycle slip having occurred 60 seconds ago and a constellation error of 0.07 meters (1-sigma). Vessel 820 is receiving the correction data from Reference station 802 with an average age of 1.5 seconds. In this example, separation distance between vessel 820 and DGPS reference station 803 is 7 kilometers and DGPS reference station 803 is receiving signals from 5 satellites with the last cycle slip having occurred 5 seconds ago and constellation error of 0.05 meters (1-sigma). Vessel 820 is receiving the correction data from Reference station 803 with an average age of 3.4 seconds. In this example, separation distance between vessel 820 and DGPS reference station 804 is 2 kilometers and DGPS reference station 802 is receiving signals from 7 satellites with the last cycle slip having occurred 120 seconds ago, with constellation error of 0.54 meters (1 sigma). Vessel 820 is receiving the correction data from Reference station 804 with an average age of 3.4 seconds. In this example, DGPS reference station 803 is selected as the optimum source of correction data since the total value after applying the weighting factors (115.8) is greater than the total for DGPS reference station 804 (63.2). DGPS reference station 802 is not used since the total number of satellites is less than the predetermined minimum number of satellites.

In the embodiment shown in FIG. 9 functions are performed on one or more variables to obtain the desired value to be used in the weighting function. Functions may be used to normalize the different input data types. The examples provided attempt to create functions that generate the reciprocal of the individual data types noise contribution. Therefore, low noise data inputs will generate high function values. In this embodiment, average age is represented by the function average age=$1/0.02*Age^2$ and cycle slips is calculated using the function cycle slips=$SQRT(N)/5$ where N is the number of continually locked measurements. Constellation error is calculated for carrier phase correction signals using the function constellation error=$1/(PDOP*0.02)$ and for code phase correction signals using the function constellation error=$1/(PDOP*0.3)$ where PDOP (Polynomial Dilution Of Precision) is the measurement quality of the common constellation. Number of satellite vehicles may be represented by the function: $f(4)=0$, $f(5)=10$, $f(6)=25$, $f(7)=35$, $f(8)=50$. Once the optimum source of correction data is determined, the correction data is coupled to the GPS processor for determining position. Since the GPS processor and the Seamless navigator are the same physical unit, the data is not managed in its transmission format after decode.

The signal is converted to a standard format which is compatible with the format used by the particular GPS processor. Thus, for example, when using a GPS processor that processes DGPS correction signals when those signals are received in a CMR format, the correction data is transmitted in a CMR-compliant format. When using a GPS processor that processes DGPS correction signals using a CMR format, and when the optimum correction source is a RTCM formatted source, the correction data is translated from the RTCM format into the CMR format prior to coupling the correction data to the GPS processor. Similarly, when a GPS processor uses a different format for receiving DGPS correction signals, the correction data from the determined optimum source is translated into the format required by the GPS processor. For example, when the GPS processor is adapted to receive correction information in a RTCM format, the optimum correction data is translated into the RTCM format prior to coupling the correction data to the GPS processor.

In one embodiment, once a source of carrier phase correction data is selected, the separation distance is not used so that the system will remain initialized while the vessel travels outside the threshold distance. Only when the system loses the carrier phase signal does the system re-evaluate the optimum correction data source. This allows for consistent position determination as long as the system receives the selected carrier phase correction data.

The present invention is well suited for use in aircraft, cars, boats, trains and other conveyances. In addition, the present invention is well suited for use with any type of system or structure which moves or is moveable when the position of the system or structure needs to be determined accurately.

In another embodiment, the seamless navigator continuously or periodically re-evaluates the current data with respect to the data that was previously chosen to determine if change-over is necessary. Sufficient histeris is provided to keep a slightly better reference station signal from bumping out the current reference station in use. Preference should always be given to the currently selected reference station.

In summary, the present invention allows for a user determine his location, course and bearing using a location determination system that uses the best available correction data. The correction data is seamlessly integrated into the location determination system. Therefore, the user does not have to purchase multiple location determination systems, each of which operates using a particular format of correction data. In addition, the user does not have to purchase multiple antennas for each of the different location determination systems. Furthermore, the user does not have to monitor the availability of different correction data sources when traveling from port to port and the user does not have to switch from one frequency to another frequency when traveling between areas having correction data broadcasts that are transmitted over different frequencies.

Thus, the present invention provides a seamless correction system which swiftly and automatically determines which of a plurality of broadcasts of correction data provides optimal accuracy for position determination and calculates position using the optimal correction data. When the optimal correction data is not broadcast in the desired format, the correction data may be converted into the desired format by the seamless correction system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A seamless correction system comprising:
   a first antenna for receiving position determination signals;
   a receiver coupled to said first antenna for demodulating said position determination signals;
   a first processor coupled to said receiver for determining position using said position determination signals;
   a second antenna for receiving position determination correction data from a plurality of sources; and
   a converter coupled to said second antenna and coupled to said first processor for receiving said position determination correction data from said plurality of sources, said converter determining the optimum source of said position determination correction data from said plurality of sources according to an algorithm and coupling the position determination correction data from said optimum source of position determination correction data to said first processor such that said first processor can more accurately determine position.

2. The seamless correction system of claim 1 wherein said first processor determines a rough position and couples the rough position to said converter, said rough position used by said converter for determining the optimum source of position determination correction data.

3. The seamless correction system of claim 1 wherein said position is determined by a location determining process dictated by the type of position determination correction data transmitted by said optimum source of position determination correction data.

4. The seamless correction system of claim 3 wherein said type of position determination correction data transmitted by the optimum source of position determination correction data determines whether said position is determined using a RTK process or whether said position is determined using a DGPS process.

5. The seamless correction system of claim 3 further comprising:
   an input device for coupling instructions to said first processor.

6. The seamless correction system of claim 5 wherein said converter accepts said position determination correction data from said plurality of sources on multiple input ports.

7. The seamless correction system of claim 6 wherein said converter accepts said position determination correction data from said plurality of sources having a RTCM SC-104 L1 C/A code format, a RTCM SC104 RTK/OTF format, and a CMR RTK/OTF format.

8. The seamless correction system of claim 6 wherein the output of said converter is in a NMEA QA/QC format data stream.

9. The seamless correction system of claim 8 wherein said converter comprises:
   a receiver coupled to said second antenna for demodulating said position determination correction data;
   a data storage device for storing data;
   an input device for coupling input to said converter; and
   a second processor coupled to said data storage device and coupled to said input device and coupled to said first processor such that the optimum source of position determination correction data is determined using the position determined by said first processor, said second processor coupling said position determination correction data from said optimum source of position determination correction data to said first processor.

10. A retrofit receiver for coupling to a differential GPS position determining system, said retrofit receiver comprising:
    an antenna for receiving position determination correction data;
    a receiver coupled to said antenna for demodulating said position determination correction data; and
    a processor coupled to said receiver for analyzing said position determination correction data so as to determine the best source of position determination correction data for accurately determining position, said processor coupling the position determination correction data from said best source of position determination correction data to said differential GPS position determining system in a format acceptable to said differential GPS position determining system such that position can be accurately determined by said GPS position determining system.

11. The retrofit receiver of claim 10 wherein said retrofit receiver further comprises:

a communication port coupled to said processor for coupling data between said GPS position determining system and said processor.

12. The retrofit receiver of claim 11 wherein said GPS position determination system determines a rough position estimate which is coupled through said communication port to said processor and wherein said processor determines said best source of position determination correction data using said rough position estimate.

13. The retrofit receiver of claim 12 wherein said retrofit receiver further comprises:

a data storage device coupled to said processor for storing data.

14. The retrofit receiver of claim 10 wherein said retrofit receiver further comprises:

an input device coupled to said processor such that instructions can be coupled to said processor.

15. The retrofit receiver of claim 10 wherein said retrofit receiver further comprises:

a conversion algorithm for converting said position determination correction data from said best source of position determination correction data into an output format acceptable to said differential GPS position determination system.

16. A method for determining position for a seamless correction system comprising:

receiving position determination correction data from two or more sources of position determination correction data;

determining a rough position;

determining the best source of position determination correction data using said position determination correction data and using said rough position;

coupling the position determination correction data from said best source of position determining correction data to a position determining system; and determining said position using said position determination correction data from said best source of position determining correction data.

17. The method for determining position of claim 16 wherein said step of determining the best source of position determination correction data further comprises the step of:

comparing the location of each source of position determination correction data that includes carrier phase correction data to said rough position so as to determine a distance from said seamless correction system to each source of position determination correction data that includes said carrier phase correction data;

comparing the distance to each source of position determination correction data that includes said carrier phase correction data to a threshold so as to determine whether the distance to one or more of said sources of position determination correction data that includes said carrier phase correction data are within said threshold;

selecting the best source of position determination correction data based on the type of position determination correction data and the distance to each source of position determination correction data that includes said carrier phase correction data when the distance to said one or more of said sources of position determination correction data that includes said carrier phase correction data are within said threshold; and selecting the best source of position determination correction data using a weighted analysis of data from each of said sources of position determination correction data that includes code phase correction data when no sources of position determination correction data that include said carrier phase correction data are within said threshold.

18. The method for determining position of claim 17 wherein said step of determining the best source of position determination correction data further comprises the step of:

selecting the best source of position determination correction data based on the type of position determination correction data and the distance from said seamless correction system to each source of position determination correction data that includes said carrier phase correction data when the distance to said one or more of said sources of position determination correction data that includes said carrier phase correction data are not within said threshold and when no sources of position determination correction data that include said code phase correction data are received.

19. In a computer system including a processor coupled to a bus, and a memory unit coupled to said bus for storing information, a computer-implemented method for determining which of a plurality of sources of position determination correction data is to be used for position determination, said computer-implemented method comprising the steps of:

a) storing a plurality of signal identification elements corresponding to different signal formats into said computer system;

b.) receiving position determination correction data from said plurality of sources;

c.) for each source of position determination correction data, determining the type of position determination correction data using said signal identification elements;

d.) receiving rough position data; and e) determining the best source of position determination correction data based on the type of position determination correction data and based on said rough position data.

20. A computer-usable medium having computer-readable program code embodied therein for causing a computer system to perform the steps of:

a) storing a plurality of signal identification elements corresponding to different signal formats into said computer system;

b.) receiving position determination correction data from a plurality of sources;

c.) for each source of position determination correction data, determining the type of position determination correction data using said signal identification, elements;

d.) receiving rough position data; and e) determining the best source of position determination correction data based on the type of position determination correction data and based on said rough position data.

* * * * *